US011266074B2

(12) United States Patent
Kaneppele et al.

(10) Patent No.: US 11,266,074 B2
(45) Date of Patent: Mar. 8, 2022

(54) GROWING METHOD OF FRUIT TREES AND ASSOCIATED TREE

(71) Applicant: FENO S.R.L., Egna (IT)

(72) Inventors: Reinhard Kaneppele, Termeno (IT); Ernesto Curti, Laives (IT); Hermann Oberhofer, Termeno (IT); Paul Rautscher, Appiano Sulla Strada Del Vino (IT); Karl Werth, Appiano Sulla Strada Del Vino (IT)

(73) Assignee: FENO S.R.L.

( * ) Notice: Subject to any disclaimer, the term of this patent is extended or adjusted under 35 U.S.C. 154(b) by 0 days.

(21) Appl. No.: 17/049,664

(22) PCT Filed: Apr. 26, 2019

(86) PCT No.: PCT/IB2019/053439
§ 371 (c)(1),
(2) Date: Oct. 22, 2020

(87) PCT Pub. No.: WO2019/207535
PCT Pub. Date: Oct. 31, 2019

(65) Prior Publication Data
US 2021/0127590 A1 May 6, 2021

(30) Foreign Application Priority Data
Apr. 26, 2018 (IT) .......... 102018000004881

(51) Int. Cl.
*A01G 2/30* (2018.01)
*A01G 22/05* (2018.01)
*A01G 9/12* (2006.01)
*A01G 23/04* (2006.01)

(52) U.S. Cl.
CPC .............. *A01G 2/30* (2018.02); *A01G 9/122* (2013.01); *A01G 22/05* (2018.02); *A01G 23/04* (2013.01)

(58) Field of Classification Search
CPC .......... A01G 1/06; A01G 17/06; A01G 17/00; A01G 17/005; A01G 17/02; A01G 2/30; A01G 22/05; A01G 9/122; A01G 23/04
See application file for complete search history.

(56) References Cited

FOREIGN PATENT DOCUMENTS

| CH | 705 502 | 3/2013 | | |
|----|---------|--------|---|---|
| CN | 106 258 788 | 1/2017 | | |
| CN | 107 409 923 | 12/2017 | | |
| EP | 2 944 186 | 11/2015 | | |
| EP | 2944186 A1 * | 11/2015 | ............ | A01G 17/06 |
| RU | 2 489 842 | 8/2013 | | |

OTHER PUBLICATIONS

Dobrosz Guyotree—an innovative apple tree guidance system 2019, retrieved on May 10, 2021, retrieved from the Internet at https://www.e-sadownictwo.pl/wiadomosci/ze-swiata/6947-guyotree-innowacyjny-system-prowadzenia-jabloni, 3 pp. (Year: 2019).*
Hinchey. AK Pioneer Fruit Growers Association Espaliers, Cordons, and Other Specialized Pruning and Training Techniques 1998, retrieved on May 20, 2021, retrieved from the Internet at https://www.apfga.org/espaliers-cordons-and-other-specialized-pruning-and-training-techniques/, 6 pp. (Year: 1998).*
Ingels. Espalier Fruit Tree Training Why Espalier? 2017 retrieved from the Internet at http://sacmg.ucanr.edu/files/265880.pdf, 6 pp. (Year: 2017).*
Patent Translate of EP2944186A1, 2021, 6 pp. (Year: 2021).*
International Search Report and Written Opinion corresponding to International Patent Application No. PCT/IB2019/053439, dated Aug. 12, 2019, 14 pp.

* cited by examiner

*Primary Examiner* — June Hwu
(74) *Attorney, Agent, or Firm* — McAndrews, Held & Malloy, Ltd.

(57) ABSTRACT

A method for the production of fruit trees including the steps of: grafting of an offshoot or propagation material of the variety to be propagated on a grafting point of a rootstock, to form a tree, planting of the rootstock in a nursery, pot or greenhouse ground and subsequent transplanting of the developed tree in a production ground; wherein the planting takes place arranging the rootstock tilted to one side to form with the ground an angle of pre-set amplitude, smaller than 90° and preferably of 45° and with the offshoot in a substantially vertical position; in the transplanting step the rootstock is arranged in the production ground in a substantially vertical position, so that the trunk of the tree, which is angled in respect to the rootstock, forms a main side branch from which vine-like branches or side branches orientated upwards sprout.

11 Claims, 4 Drawing Sheets

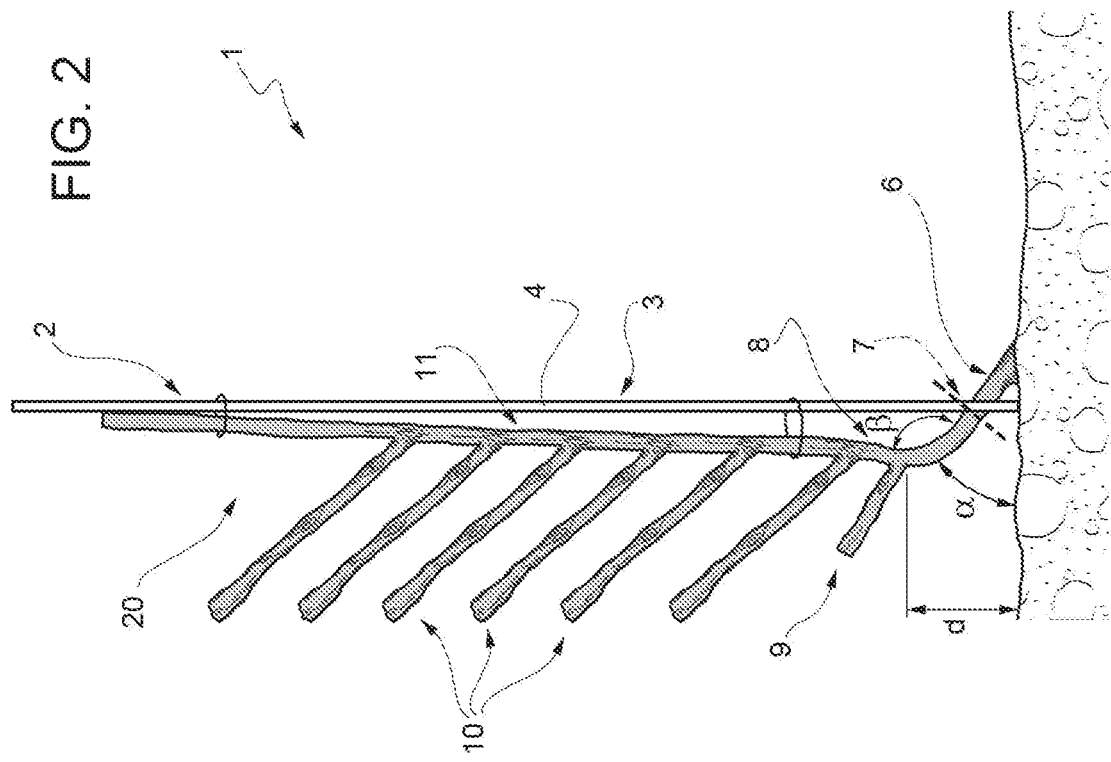

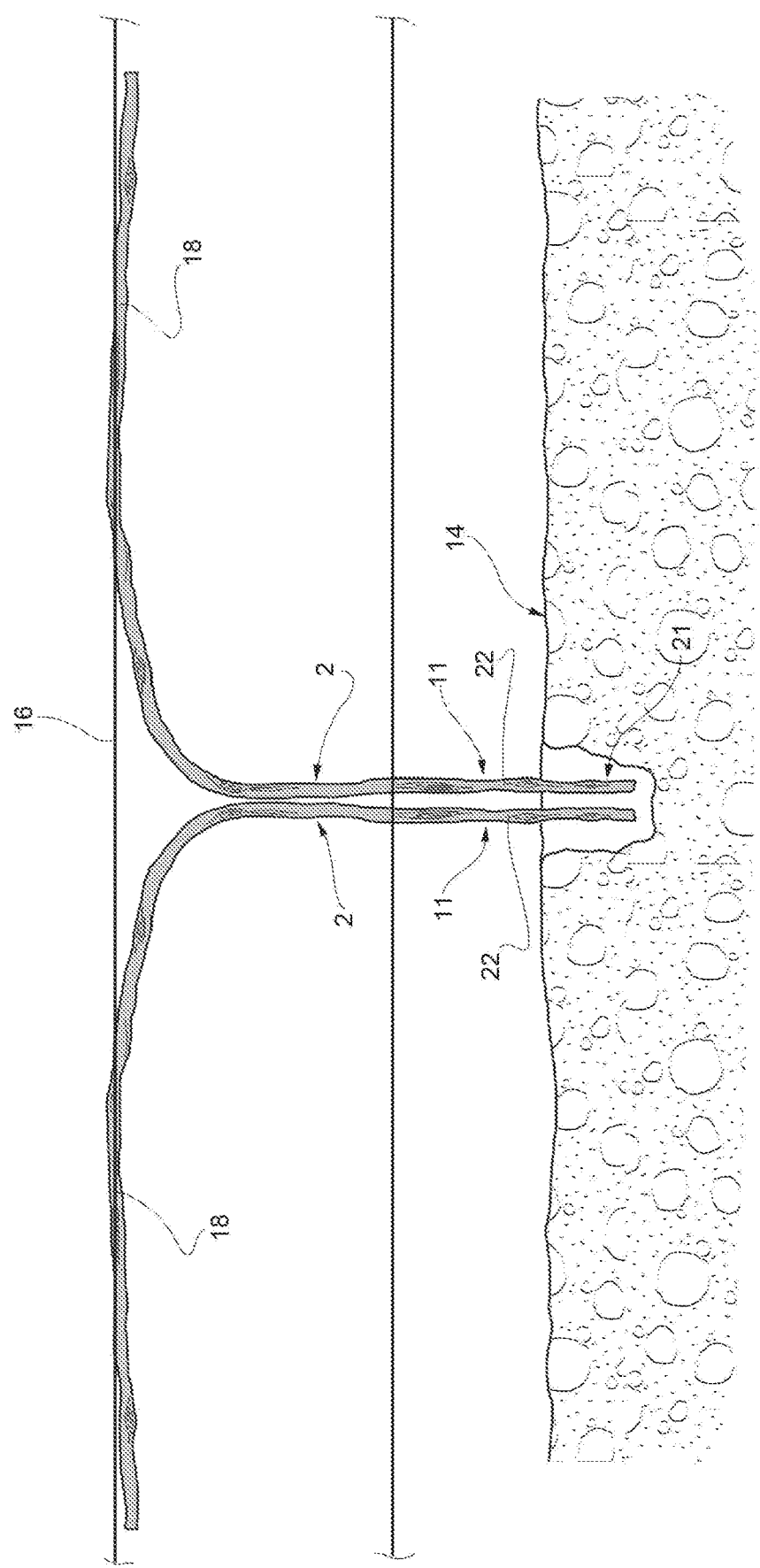

GROWING METHOD OF FRUIT TREES AND ASSOCIATED TREE

CROSS-REFERENCE TO RELATED APPLICATIONS

The present application is filed pursuant to 35 U.S.C. 371 as a U.S. National Phase application of International Application No. PCT/IB2019/053439, which was filed on Apr. 26, 2019, and claims priority from Italian Patent Application No. 102018000004881 filed on Apr. 26, 2018. The entire texts of the aforementioned applications are incorporated by reference in their entirety.

TECHNICAL FIELD OF THE INVENTION

The present invention relates to a method for the production of propagation material of fruit trees, of the type comprising a horizontal main branch. The invention also relates to a fruit tree produced with this method.

Once the trees produced with the method of the invention have been put into production, they ensure a greater uniformity of the vigour of the vertical axes and maintain the characteristic of the apical dominance.

PRIOR ART

The tree crown of a tree is composed of parts often in competition with one another (Bailey 1916; C. Giulivo 1990). With the intention of obtaining efficient production and superior quality in fruit trees, for centuries people have been taking action on the development of trees through various kinds of interventions, in particular through the techniques of grafting and pruning.

In industrial fruit growing, more and more frequently the first intervention on the structure of a tree adapted to subsequently influence its entire growth and productive life, is carried out in the nursery, i.e., during the initial development of the tree.

The most recent physiological and ecophysiological knowledge of fruit trees, and in particular of pome fruit trees, has in fact shown that trees pre-formed in the nursery, whether one-year old trees or two-year old "knip" trees, consisting of a single axis provided with an adequate number of side shoots, positioned at pre-set heights, form the best starting material to obtain efficient orchards from the point of view of production and quality, also able to be rapidly put into production.

However, the use of trees with only one axis in the creation of orchards has some drawbacks:
- the need to manually position the side shoots according to the desired tilt;
- the need to have a set of branches at the base of the productive part of the wall of branches to reduce excess vigour and growth of the distal part of the tree crown;
- excessive shading of the fruits positioned on the basal branches of the tree;
- heterogeneity of gauge and colour;
- uneven ripening of the fruit carried by branches of different order, namely primary, secondary and tertiary branches;
- suboptimal photosynthetic efficiency due to excessive shading of the leaves positioned in the basal and central part of the tree;
- difficulty in controlling the vigour of the tree;
- presence of a large number of branches with apical growth, with a consequent decrease of flower induction and of the productive capacity of the tree.

To overcome these drawbacks, the Italian patent application number RM2006A000568 discloses a method for the production of fruit trees of the bi-axis type, comprising the following operations:
a. transplanting a rootstock in a growing ground and its growth;
b. grafting on said rootstock of propagation material of the variety to be reproduced for the production of shoots;
c. selection and/or modification of the position of said shoots in order to obtain two opposed shoots on each of said trees; and
d. growing of said trees until the stage in which they can be planted for the production of fruit.

According to this method it is possible to produce trees with two symmetrical main branches, which, after planting, are bent horizontally in opposite directions for the production of fruit. It reduces the need for pruning after planting; however, the aforesaid method causes a decrease of the vigour of the tree and causes considerable difficulties and high costs in the step of horizontal bending of the top to obtain a Guyot cordon.

EP2944186B1 (hereinafter EP'186) only partly overcomes these drawbacks through a method for the production of fruit trees for installations having a supporting structure, therefore designed to be planted for the production in rows, comprising the steps of:
- grafting of an offshoot or propagation material of the variety to be propagated on a rootstock and planting in the nursery at the beginning of the first growth period,
- bending of the offshoot that has formed by approximately 90°, taking action slightly above the grafting point in the same growth period and tying said offshoot to a first horizontally tensioned wire at the end of the first growth period or in spring,
- elimination by pruning of the vigorous shoots/offshoots that form in the region of the arch formed by bending, and in the region of the end of the main horizontal offshoot and in the intermediate regions, in order to obtain four vertical offshoots, located at approximately equal distances, approximately halfway through the second growth period,
- tying of the individual vertical offshoots, destined to become the vine-like fruit-bearing branches, to a second horizontally tensioned wire, eliminating any offshoots that have grown in the meantime in the region of the arch and along the branch of the horizontal extremity, before the end of the second growth period, and
- planting of the tree thus obtained at the start of the successive growth period, tying the horizontal branch to a first lower wire and the individual vertical offshoots to a second upper horizontal wire.

In substance, the trees that are obtained have the structure illustrated in the accompanying FIG. 1, which illustrates the "DAVOR" growing system, wherein F1 and F2 are the horizontally tensioned wires of the supporting structure (row) and the vertical fruit-bearing branches B that sprout from the single horizontal axis A show in length (height) and vigour less and less as they move away on the horizontal axis A from the vertical base or trunk P of the rootstock, moreover according to what is established in Sansavini et al., *Arboricoltura Generale*, page 345 and in Zucconi et al., *Metodi innovativi di allevamento dei fruttiferi a bassa richiesta di manodopera*, pages 93-96 where a mathematical formula is defined to calculate the top function fC that controls development of the tree crown, which depends on four factors, namely:
level
height
centrality
verticality
that are missing in the Davor system.

SUMMARY OF THE INVENTION

The object of the present invention is to provide a method for the production of fruit trees for installations having a supporting structure, therefore designed to be planted for the production in rows or according to the "Guyot system", without the drawbacks of EP2944186B1 and in particular that uses all four factors identified in Zucconi et al. and in which the operations required during the time in the nursery are reduced to a minimum, in which planting in the production ground, i.e., in the orchard, is facilitated in the horizontal bending operation of the top and where the productive branches, which will be fixed vertically, all have a good level of vigour, above all in the outermost part of the cordon.

Another object of the invention is to provide a fruit tree obtained according to the method of the invention.

Therefore, according to the invention it is provided a method for the production of fruit trees and an associated fruit tree for installations having a supporting structure, therefore designed to be planted for the production in rows or according to the so-called "Guyot system", having the characteristics set forth in the appended claims.

In particular, in respect to the method according to RM2006A000568 bending is facilitated.

Moreover, the DAVOR system does not allow the cordon to be tied at the height chosen by the farmer, obliging the height to be based on the bending of the tree in the nursery. Instead, the system according to the invention can by tilted at will, choosing the height required by the farmer. Therefore, the farmer's choices are more flexible.

BRIEF DESCRIPTION OF THE DRAWINGS

Further characteristics and advantages of the present invention will be more apparent from the following description of a non-limiting embodiment thereof, implemented with reference to the figures of the accompanying drawings, wherein:

FIG. 2 schematically illustrates a nursery growing system of a fruit tree according to the method of the invention;

FIG. 3 schematically illustrates, on an enlarged scale, a detail of the plant of FIG. 2;

FIGS. 4 *a*) and *b*) schematically illustrate the steps of transplanting the fruit tree of FIG. 2 in a production ground according to the method of the invention, whereas FIG. 4A shows arranging the rootstock in the production ground in a substantially vertical position and FIG. 4B shows fixing a main branch and vine-like branches or side branches orientated upwards to a supporting structure to keep them in position, bending the trunk 11, forming a bend therein, so that the main branch is arranged substantially horizontal FIG. 5 illustrates a possible variant of the method of the invention.

DETAILED DESCRIPTION

Figure 1:
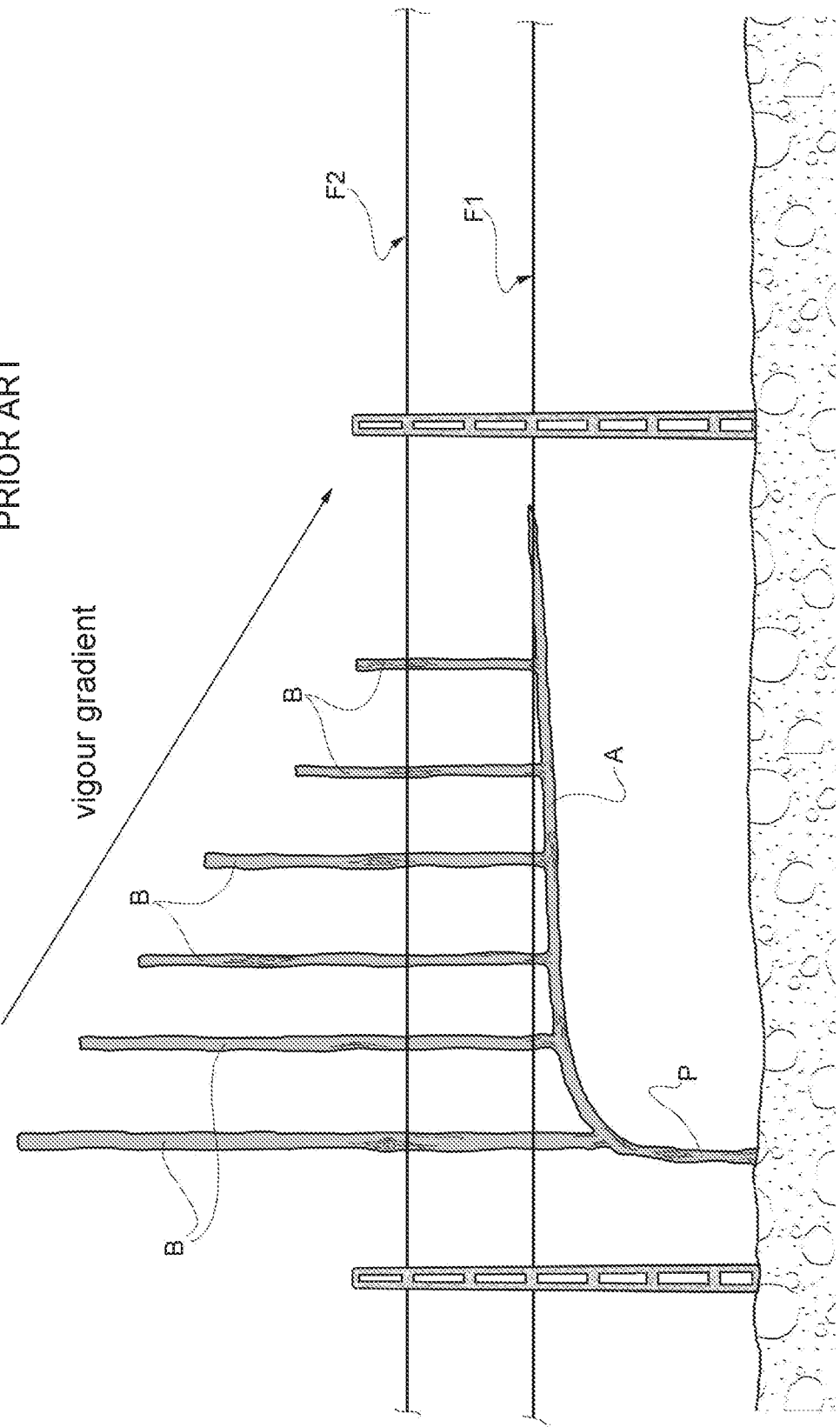
FIG. 1 schematically illustrates a Guyot growing system applied to a tree obtained according to the methods of the state of the art.

With reference to FIGS. 2 and 3, the reference numeral 1 indicates a nursery production system of fruit trees 2, in particular apple or pear trees, it being understood that the method described below can also be applied to any other fruit tree.

The system 1 comprises a supporting structure 3 for a plurality of trees 2 or for each tree 2 (as illustrated by way of non-limiting example); the trees 2 are arranged side-by-side in a known manner and not illustrated for simplicity; for example, the supporting structure 3 consists of a known pole support 4 for each tree 2, arranged adjacent (as illustrated by way of non-limiting example) or at a certain horizontal distance from the tree 2.

Moreover, the system 1 naturally comprises a nursery growing ground 5, for example an agricultural ground in a field, pots or greenhouses.

Each tree 2 comprises a rootstock 6 of a known type on a grafting point 7 of which (indicated schematically by a line) an offshoot 8 or other propagation material of the variety to be propagated has been grafted, or will subsequently be grafted, in a known manner, for example an offshoot of an apple variety, provided with at least a first bud or side branch 9. A plurality of side branches (or buds) 10, arranged farther from the rootstock 6, can also be present, or can develop subsequently.

In particular, according to an aspect of the invention, each tree 2 present in the system 1 is bent in order to arrange the offshoot or propagation material 8 of the variety to be propagated, after having grafted it on the rootstock 6 (before or after a planting step that shall be seen, in which the rootstock 6 is planted in the ground 5), in a substantially vertical position, to form with the rootstock 6 an angle β of pre-set amplitude and however wider than 90°, preferably ranging between 120 and 150 degrees. In this way, the offshoot or other propagation material of the variety to be propagated 8 will form a trunk 11 of the tree 2.

Figure 4:
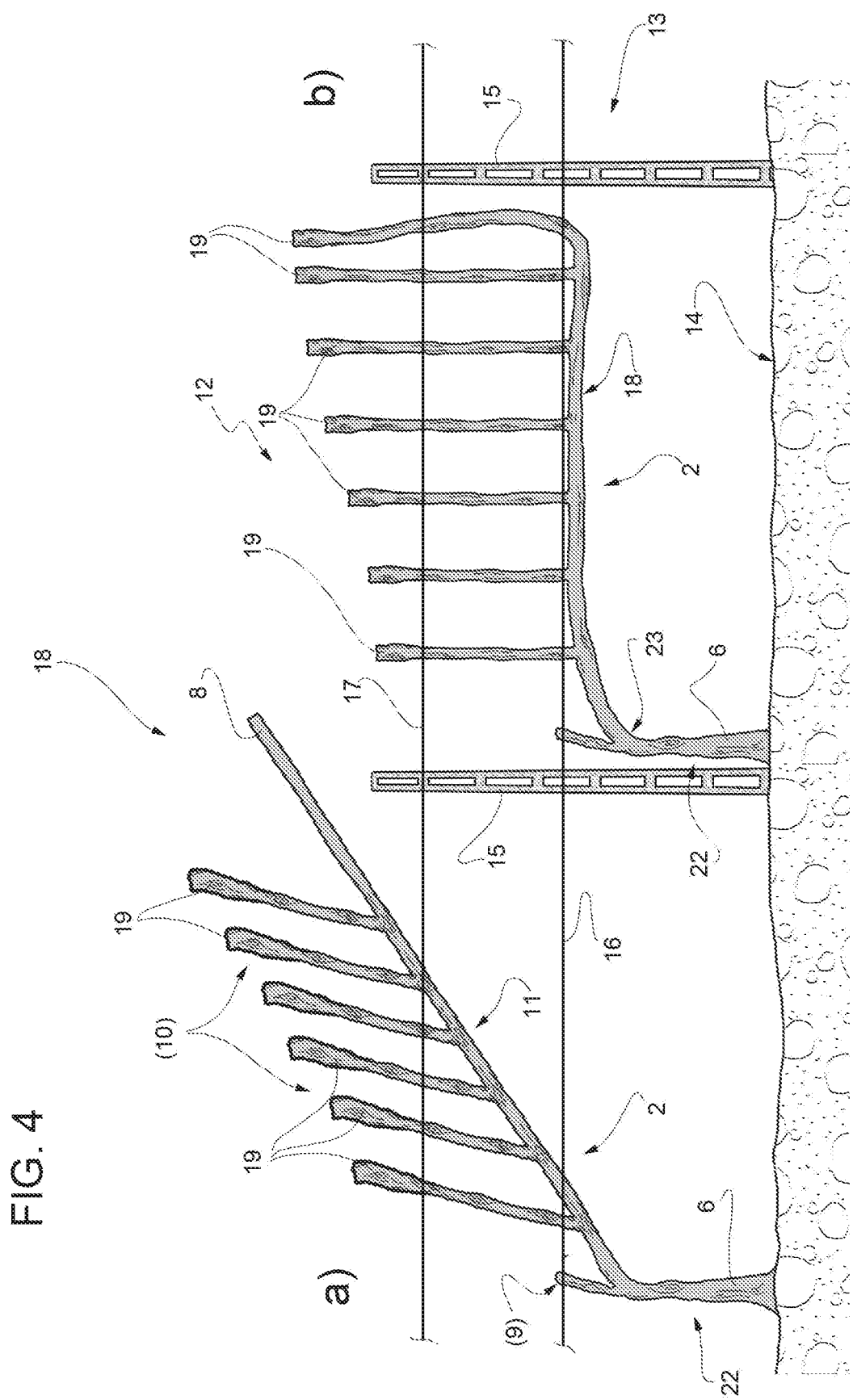

With reference to FIG. 4, the reference numeral 12 instead indicates a system for production in open ground utilising the trees 2 previously grown in the nursery. The system 12 is of the type utilising the so-called "Guyot" system, i.e., of the type grown in rows, and therefore requires a supporting structure 13, installed in a production ground 14, for example any open-field agricultural ground.

The supporting structure 13 is of known type and comprises a plurality of poles 15 installed in the ground 14 and at least one lower tensioned wire 16 and one or more tensioned wires 17, arranged above (i.e. higher than) the wire 16; the wires 16 and 17 are supported by poles 15.

According to an aspect of the invention, the trees 2 already formed (therefore, after the period in the nursery) are planted in the ground 14 with the rootstock 6 arranged substantially vertical, so that the trunk 11 of the tree, which is angled in respect to the rootstock, forms a main side branch 18 from which vine-like branches or side branches 19, which have developed from the buds 9,10, sprout; the side branches 19 are arranged orientated upwards.

According to the invention, these vine-like branches or side branches 19 are all provided with great vigour, substantially similar but above all with greater vigour towards the top.

To obtain the results illustrated in FIGS. 2 to 4 and described above, it is necessary to carry out a method for the production of fruit trees 2 for installations (systems) 12 having a supporting structure 13, therefore trees 2 designed to be planted for the production in rows, a method that is an integral and qualifying part of the invention.

This method according to the invention comprises the steps of:

grafting of an offshoot 8 or other propagation material of the variety to be propagated on a grafting point 7 of a rootstock 6, to form a tree 2;

planting of the rootstock 6 in a nursery, pot or greenhouse ground 5 at the beginning of, or during, a first growth period of the tree 2; this step can indifferently be carried out immediately after or immediately before, i.e., follow or precede, the grafting procedure, transplanting the already developed tree 2 into a production ground 14 provided with a system 12, carried out after at least a second growth period, preferably of a duration of at least a year, of the tree in the nursery.

According to the invention, during the planting step, or as soon as possible after the planting step, the rootstock 6 is arranged tilted to one of its sides 20, in respect to the ground (pot or greenhouse) 5, so that the rootstock 6 forms with the ground 5 a first angle α of pre-set amplitude and however smaller than 90°; after grafting, which based on what has already been described can take place indifferently before or after the planting step, also the tree 2 formed by the rootstock 6 and by the offshoot 8 or other propagation material of the variety to be propagated forms with the ground a first angle α of pre-set amplitude and however smaller than 90°.

In particular, according to a preferred aspect of the invention, if the grafting is carried out before the planting step, the planting step is carried out by planting the rootstock already tilted in the ground 5 to form the angle α. If, instead, the grafting step is carried out after planting, the planting step is carried out planting the rootstock 6 substantially vertical, i.e., not tilted, to then tilt it subsequently, after having carried out the grafting step of the offshoot (or other propagation material) 8.

In any case, after grafting and after planting the tree 2 in the ground 5, the rootstock 6 must always be arranged tilted by the angle α in respect to the ground 5.

Moreover, the tree 2, obtained after planting and grafting (not necessarily in this order, but also in reverse order), is bent in order to bring the offshoot 8 or other propagation material of the variety to be propagated, previously grafted on the rootstock 6, into a substantially vertical position; this step is carried out by operating at the grafting point 7 or above the grafting point 7, preferably at a distance of at least 15 cm from the rootstock 6 (FIG. 2).

The bending step in the nursery is carried out by bending the offshoot 8 or propagation material of the variety to be propagated, to form the trunk 11 of the tree 2, on the opposite side to the first angle α of pre-set amplitude formed by the rootstock 6 with the ground 5, in order to form between the trunk 11 of the tree 2 and the rootstock 6 a second angle β of pre-set amplitude, wider than that of the first angle α.

After bending, the tree 2 is grown in the nursery, pot or greenhouse ground 5 supporting the offshoot 8 or other propagation material of the variety to be propagated in a vertical position by means of a support pole 4, so that the tree 2 develops above the grafting point 7 and from the offshoots (or twigs) 9,10 a plurality of vine-like branches or side branches 19 arranged on the side of the first pre-set angle α formed between the rootstock 6 and the ground 5.

According to an aspect of the invention, the pole 4 is planted in the ground 5, rather than in a position immediately adjacent to the tree 2 (as shown by way of non-limiting example in FIG. 2), at a certain distance, measured horizontally, from the tree 2, i.e., moved away from the tree 2, on the side 20, for example at a distance ranging between 5 and 25 cm, in order to facilitate the bending operation.

During the development step of the tree in the nursery (pot or greenhouse) ground 5, any branches that develop from the side of the angle β, i.e., the opposite side to the side 20, are preferably removed by means of pruning.

According to a further aspect of the invention, moreover, the transplanting step is carried out arranging the rootstock 6 in the production ground 14 in a substantially vertical position, so that the trunk 11 of the tree 2, which is angled in respect to the rootstock 6, forms a main branch 18 from which the vine-like branches or side branches 19 sprout; during this step, the vine-like branches or side branches 19 are also arranged orientated upwards (FIG. 4a);

The main branch 18 and the vine-like branches or side branches 19 orientated upwards are subsequently fixed to the supporting structure 13 to keep them in position, in the case in hand they are tied in a known way to the tensioned wires 16 and 17. At this point, each fruit tree 2 is in production conditions.

After this step of transplanting and planting in the growing ground 14 in the field, any branches that have developed on the side of the angle β, i.e., the opposite side to the side 20, and which have not been previously removed, are eliminated.

The second angle β of pre-set amplitude must, according to the invention, be wider than 90°, and preferably ranges between 120° and 150°.

Instead, the first angle α of pre-set amplitude must be smaller than 90° and preferably is chosen equal to 40-45°.

The transplanting step is carried out when the tree 2 has developed and is ready for production in a successive growth period.

According to another aspect of the invention, the planting step is carried out leaving at least a part of the rootstock 6 out of the ground.

In particular, the planting step is carried out by leaving the rootstock 6 above ground level by at least 5 cm in length, preferably 22 cm in length and/or so that a first offshoot 9 of the shoot or propagation material of the variety to be propagated is found, after grafting, preferably at a distance of 22 cm from the ground, this latter value in the case in which the rootstock 6 is planted vertically to then be arranged in the described tilted position. After the rootstock 6 has been arranged in the final position after planting, therefore arranged tilted in respect to the ground as described above, the distance of the first offshoot 9 from the ground is reduced to approximately 15 cm.

Instead, in the transplanting step, the trunk 11 is bent, forming a bend 23 therein (FIG. 4b), so that the main branch 18 is arranged substantially horizontal.

The bending step of the offshoot 8 or other propagation material of the variety to be propagated after planting is carried out with the aim of tying the offshoot to the pole.

Moreover, the bending step of the trunk 11 at the end of the transplanting step takes place so that the main branch 18 is arranged substantially horizontal and the bend is carried out at a minimum height of the trunk 11 of 25 cm and preferably at a height of the trunk 11 ranging between 40 and 70 cm from the ground.

According to what is shown in FIG. 5, the transplanting step is carried out by planting two trees 2 coming from the nursery in the same hole 21 made in the ground 14, with the respective main side branches 18 facing in mutually opposite directions and substantially aligned coaxially. In this way, a growing structure similar to that obtainable with the Italian application no. RM2006A000568 is obtained, with the advantage of the precociousness given by two single trees.

To facilitate both planting of the trees 2 in the ground 5 of the nursery, greenhouse or pot with the rootstock 6 arranged tilted to form the angle α with the ground 5, and the subsequent development of the tree 2 maintaining the arrangement illustrated in FIG. 2, the trunk of the rootstock 6 can be constrained to a U-shaped bracket (of known type and not illustrated for simplicity) that is planted tilted in the ground 5, preferably with an angle opposite to the angle α, to form with the rootstock 6 a sort of triangular-shaped figure.

Therefore, by means of the method of the invention it is possible to obtain a fruit tree 2 that, after the transplanting step in the production ground 14, has a trunk 11 having a vertical base stretch 22 of at least 25 cm in height, from which a single main branch 18 sprouts, arranged substantially horizontal and provided at the top with a plurality of vine-like branches or side branches 19 orientated vertically and characterised in that, immediately after the transplanting step in the production ground 14, the farther the vine-like branches or side branches 19 are from the base stretch 22 of the trunk 11, the longer and more vigorous they are, and in that, after the transplanting step, the tree 2 develops further, naturally producing vigorous offshoots in proximity of the bend 23 of the trunk 11, so that the vine-like branches or side branches 19 found farthest from the base stretch 22 of the trunk 11, already more developed, maintain their vigour, whereas the vine-like branches or side branches 19 closest to the base stretch 22 of the trunk 11 increase in vigour and length until developing a productive fruit tree 2 having vine-like branches or side branches 19 all having the same vigour.

Moreover, the trees 2 according to the invention, have the substantially horizontal main side branch 18 that extends for a length longer than 100 cm and preferably ranging between approximately 120 and 180 cm.

These characteristics are obtained thanks to the fact that, by means of the method described, the trees 2 maintain the characteristic of "apical dominance" in all steps of growth and production.

"Apical dominance" is that physiological phenomenon in plants whereby the growing top inhibits and controls (hence the term "dominance") the development of the side buds, thereby regulating the shape of the tree.

Thanks to the method described, the tree in the nursery remains in vertical position maintaining apical dominance, allowing a vigorous top and strong branches to form at the top; this means that, after the planting of the tree, the vigour gradient of the branches increases outwards (FIG. 4). The tree will then naturally produce vigorous offshoots in proximity of the bend 23, so that the already well-developed outer axes (or branches) start out with an advantage and maintain their vigour, as they are taller from the start.

One of the greatest difficulties encountered in producing a Guyot system is that of bending the trees and making them take a correct position without breaking.

With the known growing methods, after bending the trunk is often tilted and this can cause problems from the viewpoint of mechanical operations of the ground. Instead, at least 25 cm of vertical trunk (rootstock and trunk) allows the sensor arms to operate optimally and reduces damage resulting from the use of various automated equipment.

Moreover, the method described allows full freedom to choose the height of the main wire: starting from 35 cm, the tree can be bent to any height (normally between 50 and 70 cm); on the contrary, with the growing system known from EP'186 it is requires 70 cm, as the trees are already bent to a right angle.

Trees 2 such as those described and obtainable according to the invention also facilitate planting in pairs in the same planting hole (FIG. 5) creating very distant inter-rows and probably creating greater root competition between the trees.

This configuration of FIG. 5 has considerable advantages when curves longer than and also shorter than 180 cm are required, on the contrary to known configurations.

The system with a low wall of branches obtainable according to the invention is without doubt the most sustainable both from an environmental and from a financial point of view:
- it facilitates carrying out plant health treatments also allowing, in the vicinity of sensitive areas, treatments without the use of air, while alternate rows can be treated in the open field, reducing distances and manoeuvres in respect to conventional orchards;
- it reduces manual pruning, collection and thinning costs as these operations are carried out prevalently from the ground or with the aid of very small carts and are facilitated considerably by the visibility that the narrow wall of branches offers;
- the quality of the fruit is high and homogeneous, production yields are at least comparable to standard yields but there is a tangible possibility of them being higher due to the increased light interception;
- a series of innovative operations are possible only on this type of orchard (viewing systems, robotic harvesting, defoliation with machinery, etc.).

Grafting of the offshoot 8 or other propagation material of the variety to be propagated on the rootstock 6 is carried out using any one of the grafting methods known in the art, indifferently, without this modifying the results obtainable with the method described.

Therefore, all the objects of the invention are achieved.

The invention claimed is:

1. A method for the production of fruit trees for installations having a supporting structure, therefore designed to be planted for the production in rows, comprising the steps of:
   grafting of an offshoot or propagation material of the variety to be propagated on a grafting point of a rootstock, to form a tree;
   planting of the rootstock in a nursery or pot or greenhouse ground at the beginning of, or during, a first growth period,
   transplanting the tree into a production ground;
   wherein
   a) during or after the planting step, the rootstock is arranged tilted to one of its sides with respect to the ground so that said rootstock during a second growth period in nursery, pot or greenhouse forms with the ground of the nursery, pot or greenhouse a first angle of pre-set amplitude and however smaller than 90°;
   b) after the grafting step and after the planting step, the tree is subjected to a bending step in order to bring the offshoot, or propagation material of the variety to be propagated, previously grafted on the rootstock, into a substantially vertical position, the bending step being operating above the grafting point, such as that:
      when the grafting step is carried out before planting, the planting step is carried out by planting the rootstock already tilted in the ground to form said first angle, or
      when the grafting step is carried out after planting, the planting step is carried out by planting the rootstock in the ground substantially vertical, and after the grafting step, the rootstock is tilted to form said first angle;

c) the tree, after the bending step, is cultivated in a nursery, greenhouse or pot by keeping the offshoot or propagation material of the variety to be propagated in a vertical position by means of a support pole, so that the plant develops, forming above the grafting point, a plurality of vine-like branches or side branches arranged on the side of the said first angle of pre-set amplitude formed between the rootstock and the ground and the bending step in the nursery, pot or greenhouse is carried out by bending the offshoot or propagation material of the variety to be propagated, to form the trunk of the tree, the bending being carried out on the opposite side to said first angle of pre-set amplitude formed by the rootstock with the ground, in order to form between the trunk of the tree and the rootstock, a second angle of pre-set amplitude wider than that of the first angle;

and d) the step of transplanting is carried out by arranging the rootstock in the production ground in a substantially vertical position, so that a trunk of the tree, which is angled in respect to the rootstock, forms a main side branch from which the vine-like branches or side branches sprout, and arranging the vine-like branches or side branches orientated upwards; and the main side branch and the vine-like branches or side branches orientated upwards are subsequently fixed to a supporting structure.

2. The method according to claim 1, wherein the second angle of pre-set amplitude is wider than 90° and preferably ranges between 120° and 150°.

3. The method according to claim 1, wherein the first angle of pre-set amplitude is smaller than 90° and preferably is equal to 45°.

4. The method according to claim 1, wherein the transplanting step is carried out when the tree is ready for production in a successive growth period.

5. The method according to claim 1, wherein the planting step is carried out by leaving the rootstock above ground level by at least 5 cm, preferably 22 cm in length and/or so that the first bud of the offshoot or propagation material of the variety to be propagated, is found, after the grafting, preferably at a distance of 22 cm from the ground, with the rootstock still in a vertical position, or at about 15 cm, with the rootstock arranged already tilted in respect to the ground.

6. The method according to claim 1, wherein in the transplanting step the trunk is bent forming a bend therein, so that the main side branch is arranged substantially horizontal.

7. The method according to claim 1, wherein the bending step of the offshoot, or propagation material of the variety to be propagated, is carried out at the grafting point or at a point higher than the grafting point after the planting step, preferably at a distance of at least 15 cm from the rootstock.

8. The method according to claim 6, wherein the bending step of the trunk at the end of the transplanting step is carried out such that the main side branch is arranged substantially horizontal, is carried out and at a minimum height of the trunk of 25 cm and preferably at a height of the trunk ranging between 40 and 70 cm from the ground.

9. The method according to claim 1, wherein the transplanting step is carried out by planting two trees, coming from the nursery, in a same hole with the respective main side branches facing in mutually opposite directions and substantially aligned coaxially.

10. The fruit tree obtained according to the method of claim 1, wherein after the transplanting step in the production ground, the trunk has a vertical base stretch of at least 25 cm in height, from which a single main side branch sprouts, arranged substantially horizontal and provided at the top with a plurality of vine-like branches or side branches orientated vertically; said fruit tree being characterised in that, immediately after the transplanting step in the production ground, the farther the vine-like branches or side branches are from the base stretch of the trunk the longer and more vigorous they are, and in that after the transplanting step the tree naturally produces vigorous offshoots in proximity of the bend of the trunk, so that the vine-like branches or side branches found farthest from the base stretch of the trunk, already more developed, maintain their vigour while, the vine-like branches or side branches closest to the base stretch of the trunk increase in vigour and length until developing a productive fruit tree having vine-like branches or side branches all having the same vigour.

11. The fruit tree according to claim 10, wherein the substantially horizontal side main branch extends for a length longer than 100 cm and preferably ranging between approximately 120 and 180 cm.

* * * * *